US005452632A

United States Patent [19]

Dürr et al.

[11] Patent Number: 5,452,632

[45] Date of Patent: Sep. 26, 1995

[54] METHOD FOR SETTING THE CUTTING REGISTER ON A CROSS-CUTTING DEVICE DISPOSED DOWNLINE OF A WEB-FED PRINTING PRESS

[75] Inventors: Wolfgang Dürr, Meckesheim; Georg Rössler, Angelbachtal; Rolf Spilz, Mannheim, all of Germany

[73] Assignee: Heidelberger Druckmaschinen AG, Heidelberg, Germany

[21] Appl. No.: 135,073

[22] Filed: Oct. 12, 1993

[30] Foreign Application Priority Data

Oct. 12, 1992 [DE] Germany .......................... 42 34 308.9

[51] Int. Cl.$^{6}$ ............................. B23Q 15/12; B26D 5/00; B41F 13/60

[52] U.S. Cl. ......................... 83/13; 83/37; 83/74; 83/364; 101/227

[58] Field of Search .................................... 83/13, 37, 72, 83/74, 364, 365, 368; 364/469, 474.09; 101/181, 224, 227

[56] References Cited

U.S. PATENT DOCUMENTS

| | | | |
|---|---|---|---|
| 3,276,647 | 10/1966 | Lewis, Jr. et al. | 83/74 X |
| 3,594,552 | 7/1971 | Adamson et al. | 101/181 X |
| 4,361,260 | 11/1982 | Hanlan | 364/469 X |
| 4,426,898 | 1/1984 | Friberg | 83/74 X |
| 4,618,391 | 10/1986 | Torti et al. | 83/74 X |
| 4,847,775 | 7/1989 | Roch et al. | 364/469 |

FOREIGN PATENT DOCUMENTS

| | | | |
|---|---|---|---|
| 0223405 | 5/1987 | European Pat. Off. | 101/227 |

*Primary Examiner*—Eugenia Jones
*Attorney, Agent, or Firm*—Herbert L. Lerner; Laurence A. Greenberg

[57] ABSTRACT

Method for setting the cutting register on a cross-cutting device positioned downline of a web-fed printing press, the position of the cut edges being variable as a function of the position of the printed image on a moving web, includes scanning with a first scanning device located directly after a last printing unit of the web-fed printing press a printed image on a moving web, generating and feeding signals regarding the printed image to a control device, generating signals with an angle sensor connected to web-guiding cylinders of the web-fed printing press, and associating the angle-sensor signals with the printed-image signals in a region between two printed images and storing the signals in the control device, generating signals regarding the printed image with a second scanning device directly before a cross-cutting device in the region between the two printed images, directing the scanning device, as viewed in a transverse direction of the web, at the same line as the first scanning device, periodically generating signals by means of a sensor for the position of the cross-cutting device, feeding the periodically generated signals to the control device and associating them with the signals of the second scanning device, regulating with the aid of the control device the phase between the signals of the first scanning device and the signals of the second scanning device to a fixed value, and transmitting signals from the control device to actuators for setting the cutting register.

1 Claim, 4 Drawing Sheets

METHOD FOR SETTING THE CUTTING REGISTER ON A CROSS-CUTTING DEVICE DISPOSED DOWNLINE OF A WEB-FED PRINTING PRESS

BACKGROUND OF THE INVENTION

FIELD OF THE INVENTION

The invention relates to a method for setting the cutting register for a cross-cutting device disposed downline of a web-fed printing press.

Ordinarily, a web passes over a great distance before it reaches a cross-cutting device, after the web has left the last printing unit of a web-fed printing press. While traversing this distance, the web is subjected to the action of additional devices for the aftertreatment of a freshly printed web, such as driers or cooling devices, for example, and is speed-dependently influenced in the position thereof by transport devices, including web-tension controllers.

In the presetting of the web-fed printing press for printing, it has become known heretofore for the phase position of a cutting cylinder of a cross-cutting device to be set manually so that the cutting line lies precisely in the intended region of the web, e.g., in the vicinity of the channel or gap formed in the rubber-blanket cylinder and in the region between two consecutive printed images, respectively. The pressman proceeds in a manner wherein, when the web-fed printing press is being set up, the printed product is constantly being subjected to a visual inspection after it leaves the cross-cutting device and, simultaneously, the phase position is being set to conform to a setpoint value by means of an input device. Only after the pressman has confirmed the desired (setpoint) position of the cutting line via the input device does a control system take over an automatic feedback control or regulation of the cutting register. Provided for this purpose inside the cross-cutting device is a device for scanning the printed image, the scanning device being directed towards the web and possibly being adjustable transversely with respect to the web-transport direction. Digitized image data which are recorded by the scanning device at the instant of confirmation by the pressman serve as the setpoint values for the feedback control or regulation of the cutting register. The feed-back-regulating device, which is present in the control system, supplies signals to actuators for setting the cutting register, the phase deviation between the setpoint-image data and the actual-image data being regulated to zero or to a fixed value.

A disadvantage thereof is that, during the setting-up of the printing press, a given period of time elapses before the desired (setpoint) position of the cutting line is confirmed by the pressman, and considerable waste is produced during this period of time. Furthermore, in order to avoid producing an unnecessary quantity of waste, the desired (setpoint) position is usually determined at a low printing-press speed, as a result of which the determination of the desired (setpoint) position is faulty, because idynamic influences under production conditions require a correction to the setpoint value.

It is accordingly an object of the invention to provide a method for presetting the cutting register on a web-fed printing press wherein the set-up time of the printing press is shortened, the production of waste is reduced, and the setting accuracy is improved.

SUMMARY OF THE INVENTION

With the foregoing and other objects in view, there is provided, in accordance with the invention, a method for setting the cutting register on a cross-cutting device positioned downline of a web-fed printing press, the position of the cut edges being variable as a function of the position of the printed image on a moving web, which comprises scanning with a first scanning device located directly after a last printing unit of the web-fed printing press a printed image on a moving web, generating signals regarding the printed image, and feeding the signals regarding the printed image to a control device, generating signals with an angle sensor connected to web-guiding cylinders of the web-fed printing press, and associating the angle-sensor signals with the printed-image signals in a region between two printed images and storing the signals in the control device, generating signals regarding the printed image with a second scanning device directly before a cross-cutting device in the region between the two printed images, directing the scanning device, as viewed in a transverse direction of the web, at the same line as the first scanning device, periodically generating signals by means of a sensor for the position of the cross-cutting device, feeding the periodically generated signals to the control device and associating them with the signals of the second scanning device, regulating with the aid of the control device the phase between the signals of the first scanning device and the signals of the second scanning device to a fixed value, and transmitting signals from the control device to actuators for setting the cutting register.

The method of the invention thus calls for signals regarding the printed image to be generated by means of a first scanning device, the scanning device being directed at the web directly after the last printing unit of a web-fed printing press. The signals regarding the printed image are associated with signals of an angle sensor for the rotational angle of the web-guiding cylinders. The signals of the angle sensor and those of the scanning device are fed to a control device or system, where the aforementioned association and the storage of the associated signals take place. Because, conventionally, the web is to be cut in the region between two printed images or in the region of the channel or gap formed in the rubber-blanket cylinder, it is sufficient if merely the characteristic image data from the gap or channel region is obtained by the first scanning device.

Furthermore, in accordance with the method of the invention, signals of the printed image in the region between two printed images are likewise generated by means of a second scanning device which is directed at the web directly before a cross-cutting device. The image signals of the second scanning arrangement are associated in the control device with signals for the position of the cross-cutting device. The image signals from the first and second scanning devices originate from one and the same scanning track or line.

In addition, the phase between the signals of both scanning devices is regulated in the control device to a fixed value, the stored signals resulting from the first scanning device being continuously compared with the signals resulting from the second scanning device.

With the aid of the method according to the invention, it is possible, without visual observation by an operator, quickly and precisely to preset the cutting register on the cross-cutting device. The control device ensures that the cutting device is automatically preset to the selected cutting position and that, should there be a deviation during the production run, the cutting position is automatically corrected. The feedback control or regulation can be set to a cut-off in the center of the gap or channel or to a fixed value beyond or away from the center of the gap or channel.

Other features which are considered as characteristic for the invention are set forth in the appended claims.

Although the invention is illustrated and described herein as a method of setting the cutting register on a cross-cutting device downline of a web-fed printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENT

Figure 1:
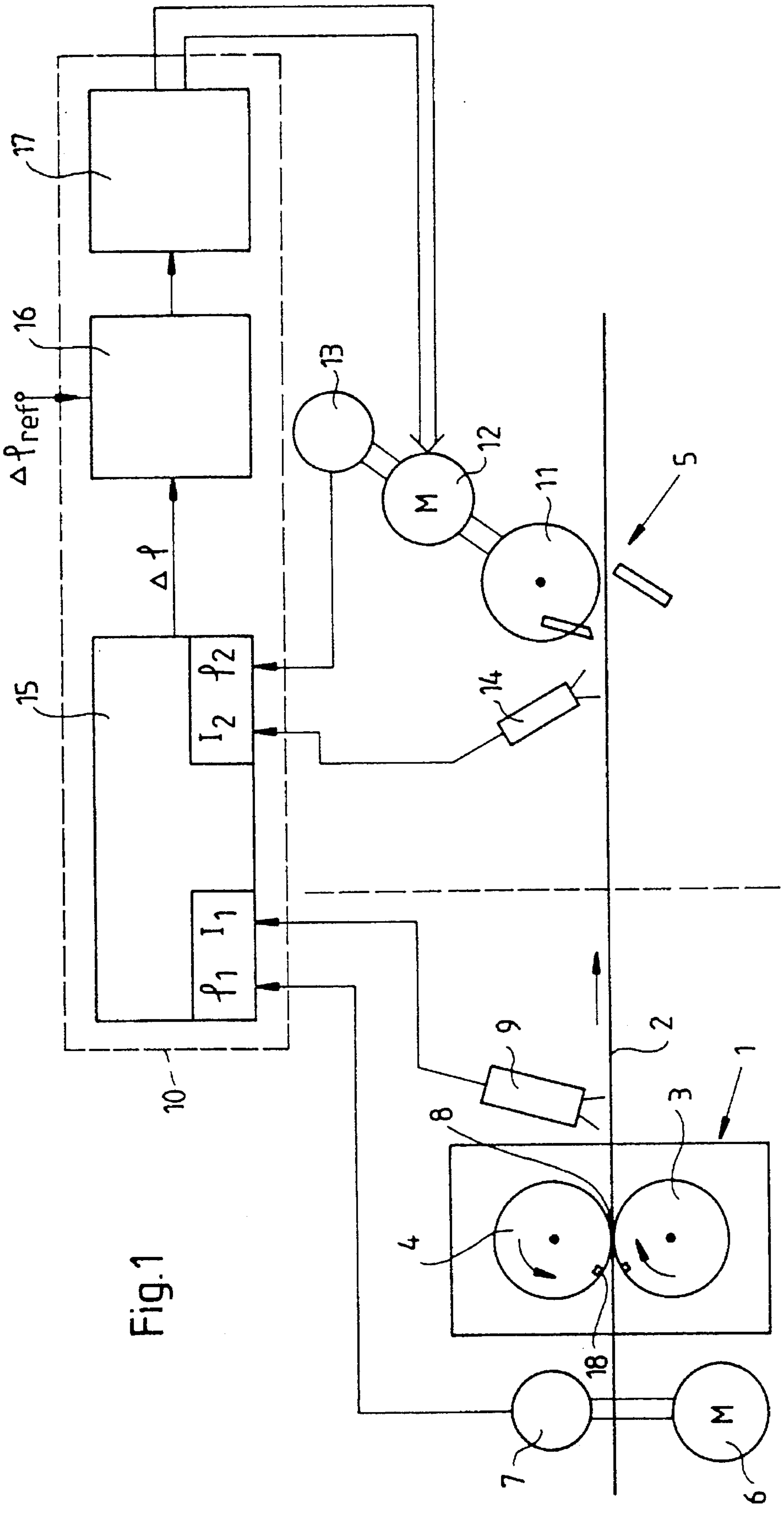
FIG. 1 is a schematic diagram, partly in block form, of a web-fed printing press with a downline cross-cutting device incorporating equipment for use in practicing the method of setting the cutting register in accordance with the invention.

Referring now to the drawings and, first, particularly to FIG. 1 thereof, there is shown therein a diagrammatic representation of a last printing unit 1 of a web-fed printing press. A web 2 is printed on both sides by two web-guiding rubber-blanket cylinders 3 and 4 in the printing unit 1 and is transported further in the direction of a cross-cutting device 5. A motor 6 drives the rubber-blanket cylinders 3 and 4 through the intermediary of a non-illustrated gear transmission. Near the rubber-blanket cylinders 3 and 4, an incremental rotary-position sensor or transmitter 7 is connected to the shaft of the motor 6. A first image sensor 9 is disposed directly behind the printing nip 8 of the last printing unit 1 of the web-fed printing press. The rotary-position sensor 7 and the image sensor 9 are connected to a control system 10.

A cutting cylinder 11 of the cross-cutting device 5 is firmly or rigidly connected to a further motor 12, the rotary position of which is likewise detected by an incremental rotary-position sensor 13. Directly in a region just before the cutoff at 5, a second image sensor 14, in the same track as the first image sensor 9, is directed towards the web 2. The image sensor 9 and the rotary-position sensor 13 are likewise connected to the control system 10.

The control system 10 includes, among other things, a circuit arrangement 15 for sensor-signal evaluation, a drive controller 16 and a power section 17 for energizing the motor 12.

Figure 4:
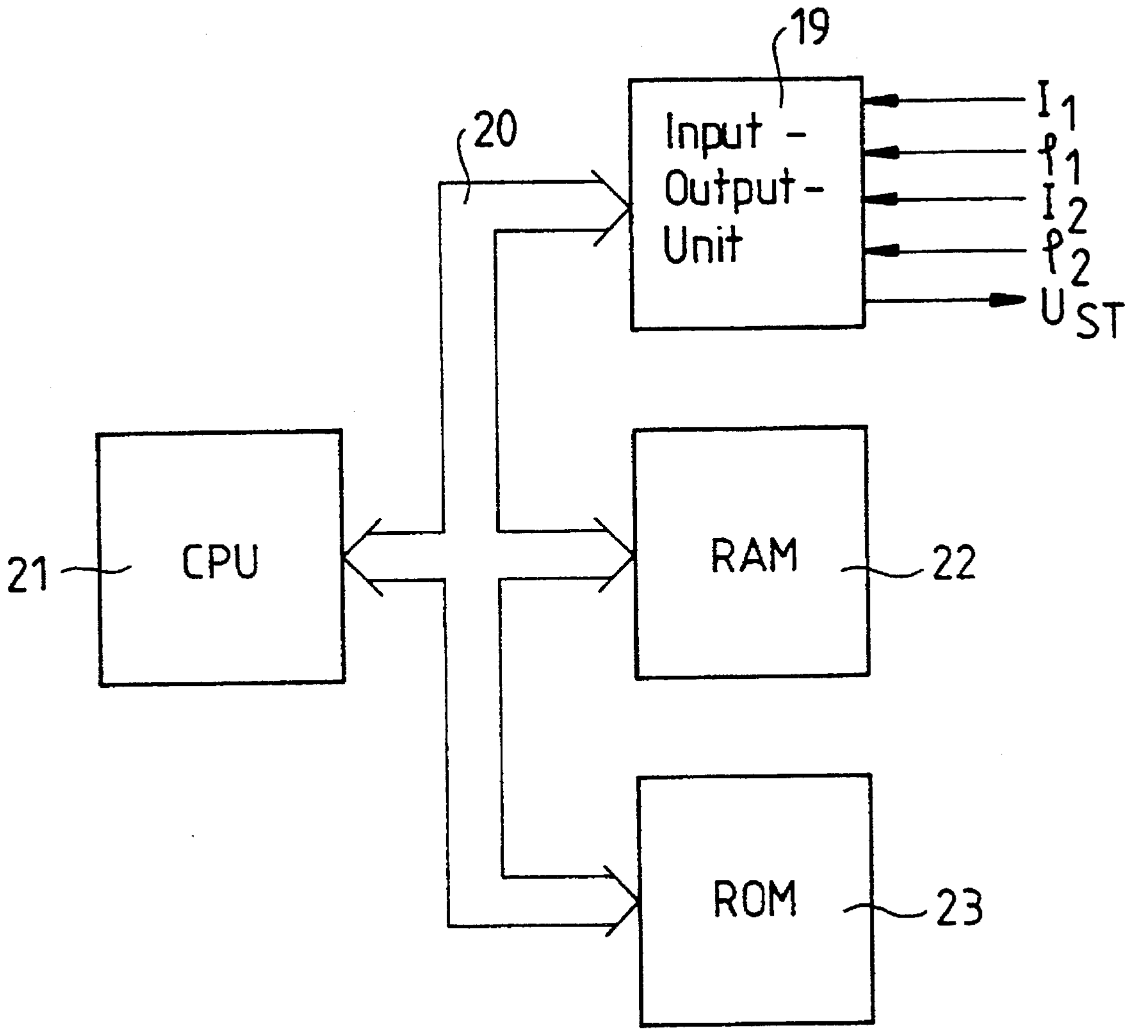
FIG. 4 is a schematic block diagram of a computer system for realizing a circuit arrangement and a drive controller forming part of the incorporated equipment.

The circuit arrangement 15 and the drive controller 16 are realized as a computer system in FIG. 4. An input-output unit 19 has four inputs which are connected, respectively, to the rotary-position sensor 7, the image sensor 9, the rotary-position sensor 13 and the image sensor 14. An output of the input-output unit 19 is connected to the power section 17. The input-output unit 19 is connected via a bus system 20 to a central processing unit (CPU) 21 with a volatile memory 22 and a non-volatile memory 23. The CPU 21 initially stores the data from the image sensor 9 and the rotary-position sensor 7 in a defined storage region of the memory 22. Thereafter, the data from the image sensor 14 and the rotary-position sensor 13 is deposited in the memory 22. In the non-volatile memory 23, the software for a program is stored which determines a differential angle or angle difference $\Delta\gamma$ from the stored data by means of a cross-correlation method.

Figure 5:
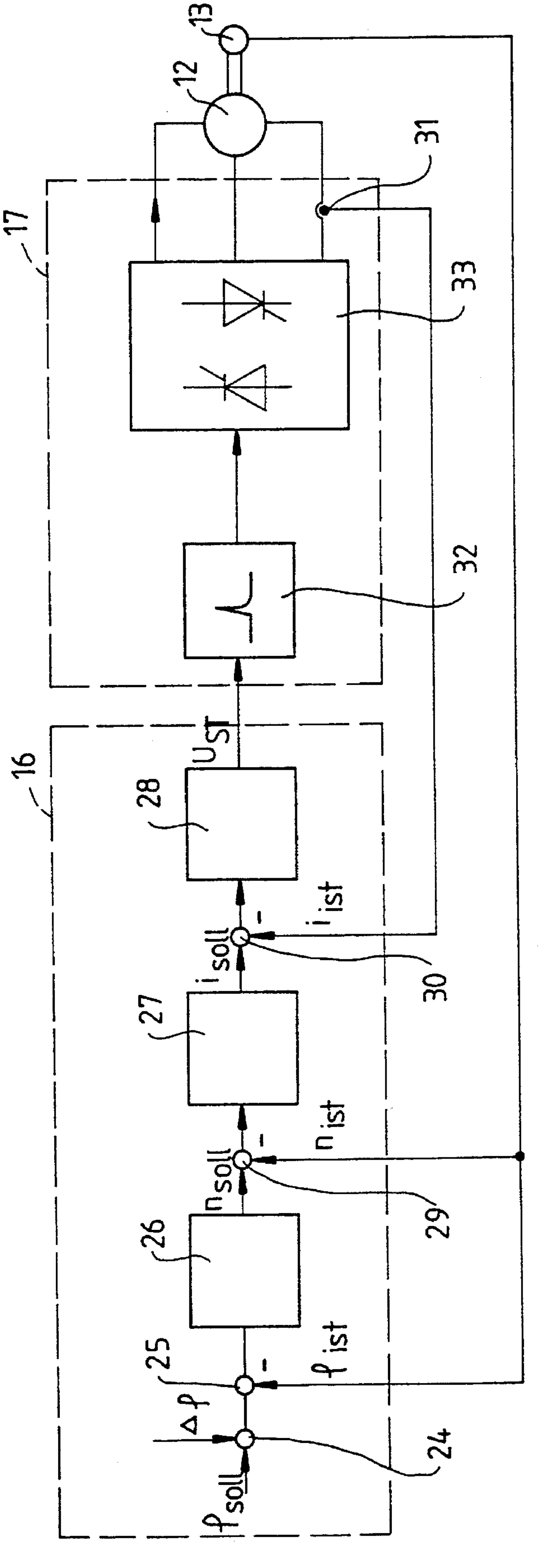
FIG. 5 is a circuit diagram of the drive controller and a power section for energizing a motor, all forming part of the incorporated equipment.

As shown in FIG. 5, the differential angle $\Delta\gamma$ is summed with an angle setpoint value $\gamma_{SETPOINT}$ in an adder 24 and the result is fed to a subtraction unit 25 of a position regulator 26. At the subtraction input of the subtraction unit 25, the actual angle value $\gamma_{ACTUAL}$ is applied from the rotary-position sensor 13.

The drive controller 16 is constructed as a cascade controller formed in series of a position controller 26, a rotary-speed controller 27 and a current regulator 28. Between the position controller 26 and the rotary-speed controller 27 and between the rotary-position controller and the current regulator 28 are respective subtraction units 29 and 30 to which at the respective inputs the actual rotary speed $n_{actual}$ and the actual current $i_{actual}$ are fed. The actual rotary speed $n_{actual}$ is likewise provided by the rotary-position sensor 13. The actual current $i_{actual}$ is determined by a current transformer 31. The position controller 26 generates at its output a signal $n_{setpoint}$ for the setpoint rotary speed, which is fed to the second input of the subtraction unit 29. At the output of the rotary speed controller 27, a signal $i_{setpoint}$ for the setpoint current is present and is fed to the second input of the subtraction unit 30. A control voltage $U_{st}$ for the power section 17 is present at the output of the current regulator 28.

The power regulator 17 has a conventional construction and is formed of a control set 32 which, as a function of the control voltage $U_{st}$ influences the blocking period of a thyristor power control element 33 so that the connected motor 12 is set or regulated with respect to the rotary position, the rotary speed and the current consumption. thereof Employing the foregoing configuration, the method according to the invention can be implemented as follows:

As the first printed image leaves the printing nip 8, the printed image beginning from the region of the groove 18 of the rubber-blanket cylinder 4 is detected by means of the image sensor 9 and is fed to the circuit arrangement 15. With the aid of the angle signals $\gamma_1$ from the rotary-position sensor 7, image data are generated and stored in the circuit arrangement 15, the image data corresponding to the image pattern in the region of the groove 18. The first and all further printed images are detected once again by means of the image sensor 14 and are fed to the control system 10. In the circuit arrangement 15, the signals are combined with the signals of the rotary-position sensor 13, from which an association between the image pattern and the angular position of the cutting cylinder 11 results.

Thereafter, the image data from both image sensors 9 and 14 are combined, resulting in a differential angle $\Delta\gamma$, which contains the cutoff position in relation to the middle of the channel or gap.

Figure 2:
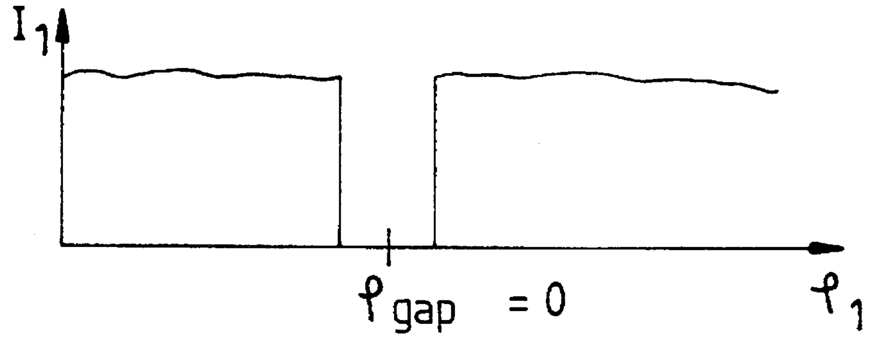
FIGS. 2 and 3 are plot diagrams of signals at scanning devices forming part of the incorporated equipment.
Figure 3:
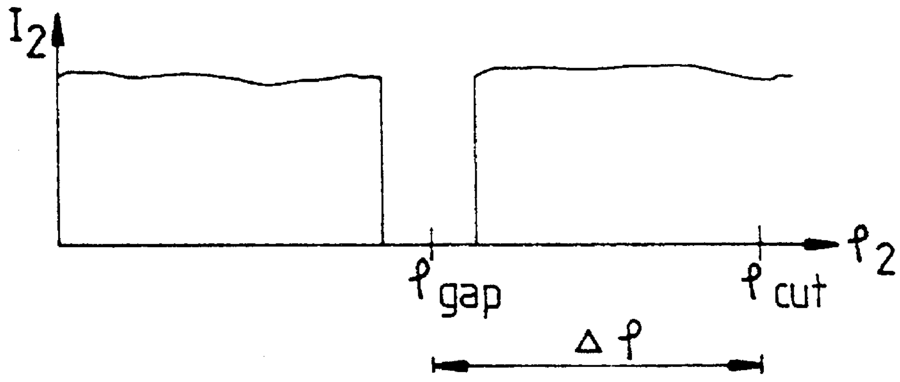

FIGS. 2 and 3 show the image-intensity signals $I_1$, $(\gamma_1)$ and $I_2$ $(\gamma_2)$, respectively, from the image sensors 9 and 14, respectively, as a function of the rotational angle $\gamma_1$ of the rubber-blanket cylinders 3 and 4 and of the rotational angle $\gamma_2$ of the cutting cylinder 11, respectively. The difference between the angles is fed as an actual value to the drive controller 16. Depending upon the deviation from a selected setpoint value $\Delta\gamma_{SETPOINT}$, the phase of the motor 12 is adjusted through the intermediary of the power section 17, with the result that the cutoff is, for example, precisely in the center of the channel or gap or at a fixed, defined distance away from the center of the channel or gap.

We claim:

1. Method for setting a cutting register on a cross-cutting device positioned downline of a web-fed printing press, a position of the edges being cut on a moving web being variable as a function of a position of a printed image on the moving web, the method comprising scanning with a first scanning device located directly after a last printing unit of the web-fed printing press a printed image on a moving web, generating signals regarding the printed image, and feeding the signals regarding the printed image to a control device, generating signals with a first angle sensor connected to web-guiding cylinders of the web-fed printing press, and associating the angle-sensor signals with the printed-image signals in a region between two printed images and storing the signals in the control device, generating signals regarding the printed image with a second scanning device located directly before the cross-cutting device in the region between the two printed images, periodically generating signals by means of a second angle sensor connected to the cross-cutting device for the position of the cross-cutting device, feeding the periodically generated signals to the control device and associating them with the signals of the second scanning device, regulating with the aid of the control device the phase between the signals of the first scanning device and the signals of the second scanning device to a fixed value, and, in response to the fixed value, transmitting control signals from the control device to actuators for setting the cutting register on the cross-cutting device.

* * * * *